Jan. 9, 1968
D. L. HILL ET AL
3,362,377
SPAN MARKER AND METHOD AND APPARATUS FOR INSTALLING SAME
Filed Aug. 29, 1966
2 Sheets-Sheet 1
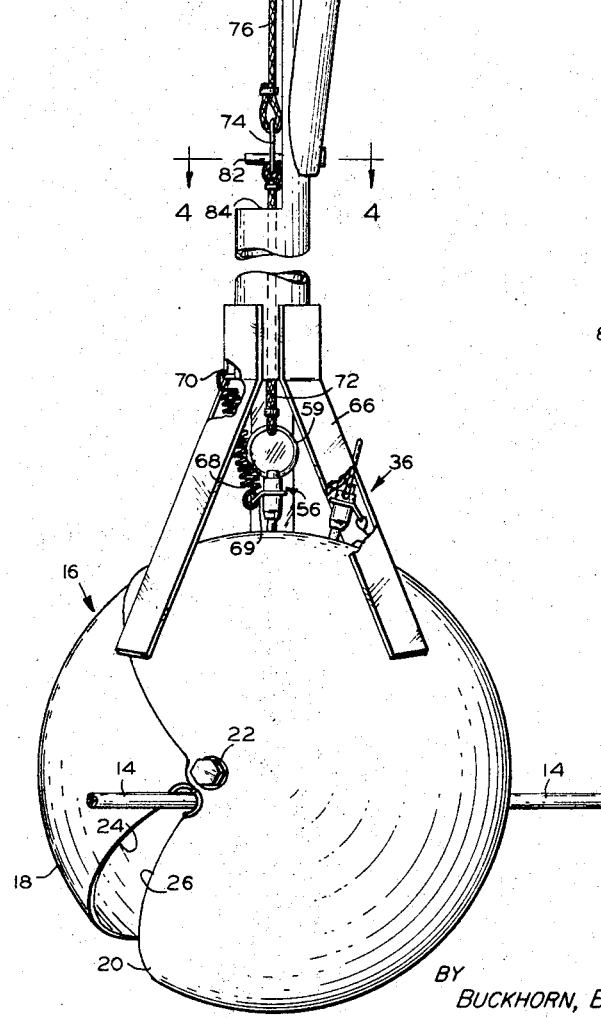
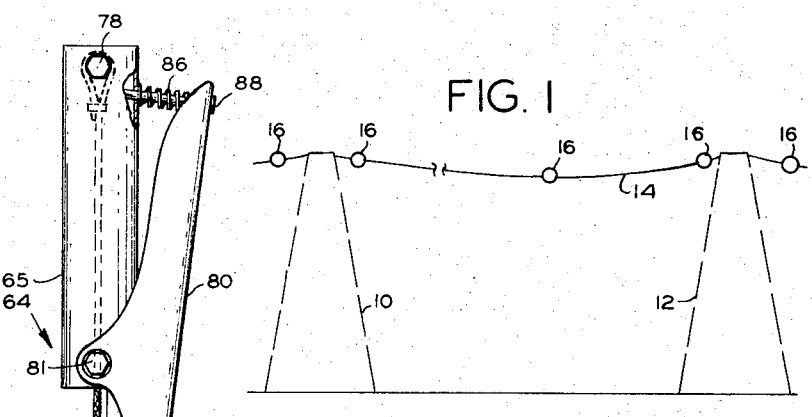
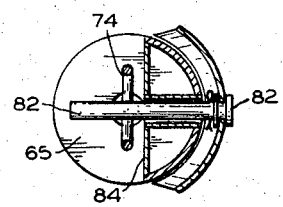
DALE L. HILL
ALAN B. MacDONALD
LYNN K. ANKRUM
INVENTORS
BY
BUCKHORN, BLORE, KLARQUIST & SPARKMAN
ATTORNEYS

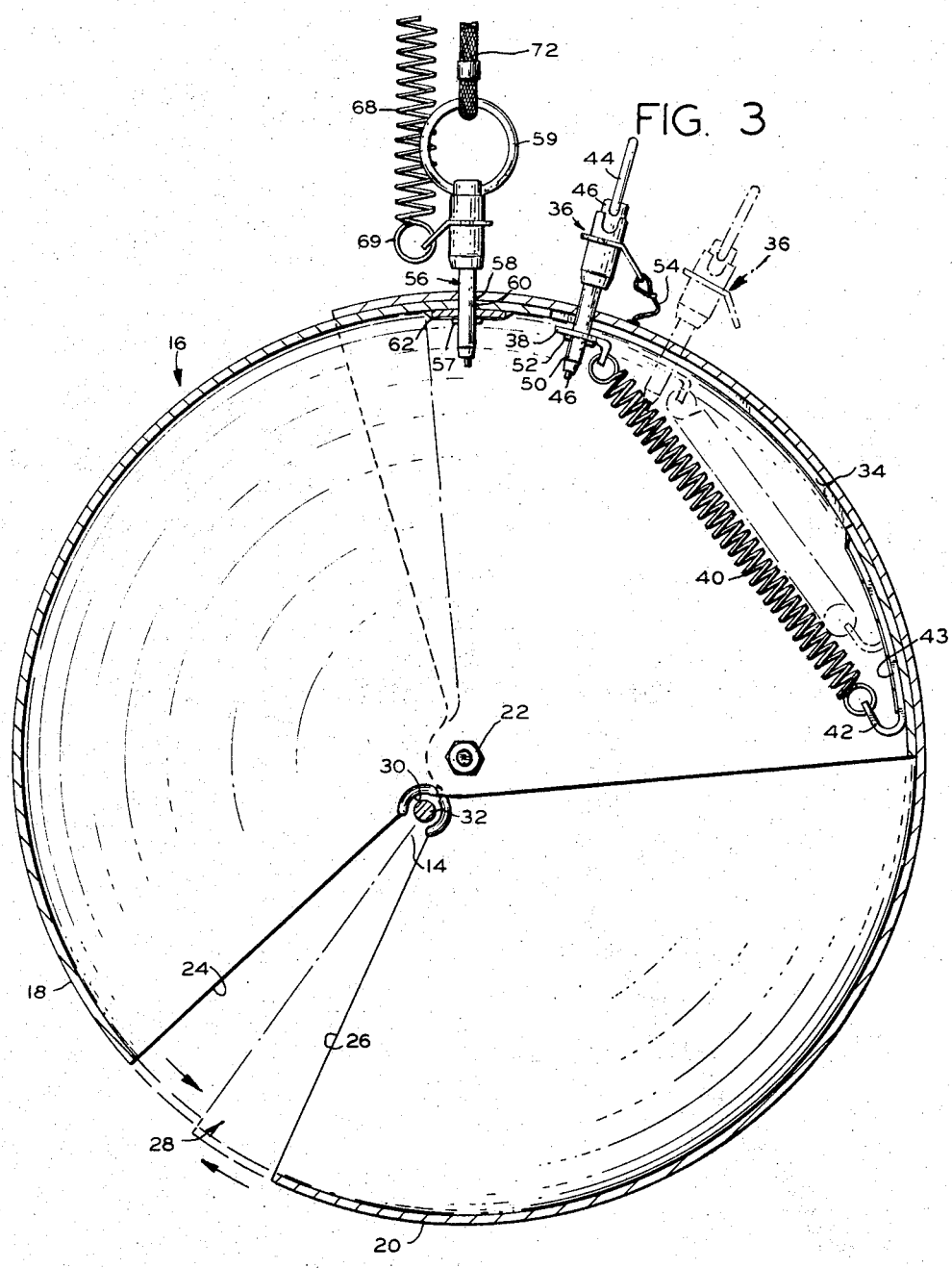

3,362,377
SPAN MARKER AND METHOD AND APPARATUS FOR INSTALLING SAME
Dale L. Hill, 126 W. 25th St., McMinnville, Oreg. 97128; Alan B. MacDonald, Rte. 3, Box 600, Dundee, Oreg. 97115; and Lynn K. Ankrum, McMinnville, Oreg. 97128
Filed Aug. 29, 1966, Ser. No. 575,769
14 Claims. (Cl. 116—114)

The present invention relates to a span marker for overhead cables and to a method of and apparatus for installing span markers on electrical transmission lines and the like.

In the recent past span markers in the form of a hollow, spherical body have been installed at intervals along the unsupported lengths of transmission lines extending between supporting towers to make such lines more readily visible to aircraft operating in the vicinity of such lines. Despite the ever-increasing number of accidents involving collisions of aircraft with transmission lines, span markers have been used sparingly heretofore, primarily because of the great difficulty and expense of installing such markers on existing transmission lines. The difficulty and expense of installation has resulted from the design of prior markers which has necessitated cutting off current flow through the lines and either removing the lines from the towers or sending men and equipment up to the towers and onto the lines in order to install the markers, such procedure being so time consuming, difficult, expensive and dangerous as to be prohibitive in most instances.

Accordingly, a primary object of the present invention is to provide a new and improved span marker which overcomes the disadvantages of prior such markers.

Another primary object is to provide a new and improved apparatus for installing span markers as aforesaid on an electrical transmission line and other overhead cables.

Still another primary object is to provide a new and improved method of installing span markers as aforesaid on transmission lines and other overhead cables.

Additional objects of the invention are to provide:

A span marker which can be installed on a transmission line more quickly and easily and at less cost than prior span markers;

A span marker which can be removed from a transmission line more quickly and easily and at less cost than prior span markers;

A span marker which can be installed on and removed from an overhead transmission line while the line is in place and conducting electricity;

A span marker including built-in means for clamping the marker on a transmission line;

A span marker as aforesaid including means for installing it on a line and removing it therefrom;

A tool for installing a span marker as aforesaid on an overhead line from a point remote from the line, as from a helicopter;

A method of installing a span marker as aforesaid on an overhead transmission line with the transmission line in place between supporting towers and conducting electricity.

The above and other objects and advantages of the present invention will become more apparent from the following detailed description which proceeds with reference to the accompanying drawings, wherein:

FIG. 1 is a schematic elevational view showing a series of span markers installed on a transmission line extending between a pair of line-supporting towers;

FIG. 2 is an elevational view showing a span marker and connected tool for installing the span marker on a transmission line, in accordance with the invention;

FIG. 3 is a transverse sectional view through the span marker of FIG. 2 taken in a plane normal to the pivot axis of the span marker and on a greatly enlarged scale;

FIG. 4 is a transverse sectional view on an enlarged scale taken along the line 4—4 of FIG. 2.

With reference to the drawings, FIG. 1 illustrates the environment of the invention including a pair of transmission towers 10, 12 which support a series of electrical transmission lines 14 extending therebetween, only one of such lines being evident. A series of span markers 16 in accordance with the invention are installed at intervals along line 14 between towers. The markers are preferably brightly colored so as to be readily visible to low-flying aircraft and thereby warn them away from the lines. The markers may be of varying diameter, but for optimum visibility under most conditions the markers are preferably at least two to three feet in diameter.

With reference to FIGS. 2 and 3, each span marker comprises a pair of nesting spherical shell segments, including an inner segment 18 and an outer segment 20, pivoted together at approximately 180 degrees opposed points by fasteners 22 for movement about a central axis passing through such fasteners. The segments are preferably made of fiberglass or other suitable high-strength dielectric material. As is evident from FIG. 3, each segment extends through an included angle of considerably more than 180 degrees so that portions of the segments overlap in both the open position of the marker as shown in solid lines in both FIGS. 2 and 3 and in the closed position of the marker as shown in phantom lines in FIG. 3.

With the marker in its open position, leading edges 24, 26 of the inner and outer shell segments, respectively, are separated so as to define an access opening 28 extending inwardly of the sphere toward its pivot axis. The opening is wide enough to permit entry of a transmission line between such segments to a position adjacent the pivot axis at the center of the sphere. Of course, the size of the access opening could be varied depending on the diameter of the cable on which the marker is to be installed.

The innermost ends of the leading edges 24, 26 nearest the pivot axis are arcuately curved to define aligned, line-receiving openings 30 at opposite sides of the sphere and as near as possible to the geometric center thereof so that the sphere will have stability when installed on a line.

With the marker in its closed position as shown in phantom lines in FIG. 3, the leading edges of the segments are next adjacent one another so that the segments define a closed, hollow spherical body. In this position openings 30 are circular. Openings 30 are sized so that when the segments are closed, the edges defining the opening will clamp about the transmission line to hold the segments in position on the line, and in fact the edges of the openings determine the limits of closing movement of the segments by their clamping engagement with the transmission line. The edges of openings 30 are preferably lined with a resilient filler 32 of rubber or other suitable material so that the segments will clamp the line without cutting it.

Th portion of inner shell segment 18 which overlaps outer shell segment 20 is provided with an elongate slot 34 the longitudinal median line of which lies in a plane generally normal to the pivot axis of the segments. A roll pin 36, which is a standard purchased item, extends through an aperture in the outer shell segment and through slot 34 of the inner shell segment adjacent one end of the latter. An inner portion of the pin within the shells anchors a washer 38 to which is secured one end of a tension spring 40. The opposite end of the tension spring is anchored to a hook 42 which in turn is bonded by a layer of fibreglass 43 to an inner surface of the inner shell segment beyond the opposite end of slot 34. Spring 40 is selected so that it is under tension when the shell segments are in either their open position or in their closed position. Thus, the spring not only urges the segments to their closed position about a transmission line such as line 14, but it also maintains the segments in clamping engagement with the line after they close.

Roll pin 36 serves a dual function. In addition to anchoring one end of closing spring 40, it also serves as a means for unclamping the marker from a line when pulled from its aperture in the outer segment. In this regard the roll pin has a release ring 44 which is welded or otherwise affixed in an upright position to enable ready grasping thereof. The ring is attached to one end of an inner shaft member 46 which is axially slidable within an outer shaft member 50. Inner shaft 48 is spring biased downwardly as shown in FIG. 3 and acts as a detent to urge a pair of ball projections 52 outwardly beyond the wall of the outer shaft 50, and these projections normally prevent the pin from being removed from the washer and from its aperture in the outer shell. However, pulling release ring 44 axially outwardly, pulls the inner shaft with it within the outer shaft against the spring action of the pin. When this occurs, a recess on the inner shaft comes in register with the ball projections so that continued pulling withdraws the pin from spring washer 38 and from the outer segment. When the pin is removed, the tension in spring 40 is released, and the segments can thus be easily removed from the line.

However, a collar on outer shaft 50 is attached by a cord 54 to an outer surface portion of the outer shell segment to prevent the pin from being entirely separated from the marker. Thus with the shell segments clamped to a transmission line, a person in a helicopter hovering above the line can, with the aid of a long pole (not shown) provided with a hook on its outer end, pull upwardly on release ring 44 and thereby release the tension in the closure spring, remove the marker from a transmission line and recover the marker.

Because closure spring 40 normally urges the shell segments to their closed position, means must be provided for temporarily maintaining the shell segments in an open position to enable installation of the marker on a transmission line. Such means includes another roll pin 56 which extends through a pair of aligned apertures 58 and 60 in the outer and inner shell segments, respectively, near the spring release pin 36 to lock the shell segments in their open position against the urging of tension spring 40. Ball projections 57 of locking pin 56 normally prevent removal of the locking pin from the segments until an axial pulling force is applied to the release ring 58 of such pin. When the pin is removed, however, closure spring 40 will act to snap the segments closed about a transmission line. The inner shell segment is preferably reinforced with a layer 62 of fibreglass about its aperture opening so as to prevent the widening thereof upon repeated use, and accidental removal of the locking pin.

Referring to FIG. 2, locking pin 56 is used in conjunction with a tool for installing the marker on a transmission line and in fact forms an important part of the installing means. The installation tool is essentially a long pole 64 comprising a tubular shaft 65 which may be of varying length depending on the method of installation. However, for use in installing the marker from a helicopter, the shaft should be about 15 feet or so in length.

The lower end of the shaft is fitted with three outwardly diverging flattened fingers 66 for engaging the exterior surface of the marker and thereby stabilizing the same at the outer end of the pole. The fingers are preferably somewhat resilient so that they are adaptable for use with markers of different diameters. A tension spring 68 is connected at one end to a collar 69 on the main body of locking pin 56 and at its opposite end at 70 to the lower end of shaft 65. The spring is under tension in this position so that it holds the marker against the fingers of the pole to enable positioning of the marker on a transmission line in its open position through manipulation of the pole.

The installation pole is also provided with a locking pin release means for pulling the pin from the segments. This means includes a lower cord 72 connected at its lower end to the release ring of locking pin 56 and at its upper end to a trigger ring 74. An upper length of stretch cord 76 is attached at its lower end to the trigger ring and is anchored at its upper end to an anchor bolt 78 at the upper end of the shaft. A hand-operated trigger lever 80 is pivoted at 81 intermediate its opposite ends to an upper portion of the shaft and has a trigger pin 82 at its lower end which extends through a recessed portion 84 of the shaft and through trigger ring 74 when the tool is in its marker-holding position as shown.

The trigger lever is biased in its marker-holding position by a coil spring 86 which encircles a pin 88 extending from the upper end of the trigger lever and through an opening in the upper end of shaft 65. The length of stretch cord 76 is selected so that it is under sufficient tension, when the trigger pin extends through the trigger ring, to pull the locking pin 56 from locking engagement with the shell segments. However, since trigger pin 82 extends through trigger ring 74, the tension of cord 76 is isolated from the locking pin 56 in the position shown in FIG. 2, such tension being taken up entirely by the trigger pin to prevent release of locking pin 56 prematurely. The pressing of trigger lever 80 toward the adjacent portion of shaft 65 withdraws pin 82 from the trigger ring to suddenly transmit the tension in cord 76 to locking pin 56 and thereby jerk the pin from the segments. When this occurs, the segments snap shut to clamp themselves on a transmission line about which the segments have previously been positioned, and at the same time the installation tool, including pin 56, is released from the marker.

*Method of installing marker*

The preferred method of installing the marker on a transmission line is by means of a helicopter, using the installation pole to lower the marker onto a transmission line from above while the line remains suspended between towers and continues to conduct electricity. Of course, when installing a span marker using this method, it is necessary that the shell segments be made of a dielectric material such as fibreglass. Also, when installing the markers on high tension lines, it might be preferred that the installing tool itself be made of a dielectric material such as a plastic or fibreglass.

More specifically the preferred method involves first locking the marker in its open position by inserting a locking pin through the aligned apertures in the overlapping portions of the nesting segments, the locking pin being attached as aforesaid to the installation pole. Since the attaching spring 68 is to both the locking pin and the pole, the marker will be held against the fingers of the pole with its access opening facing away from the pole. The pole and the necessary supply of markers are transported by helicopter to the vicinity of transmission lines on which the markers are to be installed, and with the helicopter hovering above a point on a transmission line between towers where a marker is to be installed, the marker is lowered on the pole toward the line until the transmission line extends between the separated segments and is seated within the central openings of the marker. At this point the trigger lever is pressed to release the trigger pin and thus pull the locking pin from the segments, thereby simultaneously clamping the marker on the transmission line and releasing the marker from the pole. Thereafter the preceding operation would be repeated with other markers to place them at intervals along the same and other transmission lines.

Of course, other methods could be employed such as, for example, the marker could be installed on the line from a position beneath the line using the same general technique as that just described provided that the lines were accessible from the ground surface using the installation pole and possible other elevating equipment.

The segments themselves would not necessarily have to be spherical, although it is believed that spherical segments would be the most economical to produce and the strongest. The segments might also be of cylindrical shape, or in fact a segment of any surface of revolution, which would give the desired nesting effect and enable the necessary relative movement between segments.

Having illustrated and described a preferred form of the invention, it should be obvious to those skilled in the art that the invention permits of modification in arrangement and detail. We claim as our invention also all such modifications as come within the true spirit and scope of the following claims.

We claim:

1. A span marker for electrical transmission lines and the like comprising:
   a pair of nesting shell segments pivotally connected together for movement about a common axis,
   said shell segments being movable about said axis from an open position wherein said segments are separated along opposed edge portions thereof to a closed position wherein said segments define a substantially closed hollow body and said edge portions define a central opening through said body for receiving a transmission line,
   said opening being sized so that said edge portions at said opening engage the transmission line with said segments in their closed position and so that said line can easily be received within said opening with said segments in their open position,
   means interconnecting said shell segments urging said segments to their closed position and providing a clamping force at said opening with said segments in their closed position about the line,
   and means for selectively maintaining said segments in their open position to enable installation of said marker on the transmission line.

2. A device according to claim 1 wherein said shell segments in cross section normal to said pivot axis describe arcs of a circle, with at least one of said arcs extending through an included angle of greater than 180 degrees.

3. A device according to claim 1 wherein said shell segments define surfaces of revolution.

4. A device according to claim 1 wherein said shell segments are spherical segments so that when said segments are in said closed position they define in general a closed hollow sphere.

5. A device according to claim 1 wherein said means for selectively maintaining said segments in said open position include releasable pin means extending through aligned apertures in both said segments.

6. A device according to claim 5 wherein said pin means comprises a locking pin having means normally preventing removal of said pin from said apertures and release means exterior to said segments permitting removal of said pin from said apertures upon the application of a pulling force thereto.

7. A device according to claim 1 including removal means in association with said urging means for rendering said urging means inoperative and thereby permitting removal of said segments from a transmission line on which said segments have previously been clamped.

8. A device according to claim 7 wherein said removal means includes means operable from the exterior of said segments by application of a pulling force thereto.

9. A device according to claim 1 wherein said urging means comprises a tension spring extending under tension within said segments and connected at one end to the inner one of said segments and at the opposite end to a pin extending through an aperture in the outer one of said segments and through a slot in said inner segment, said slot extending between the opposite ends of said spring, said pin being removable from said spring upon application of an outward pulling force thereto so as to release said spring tension and thereby permit removal of said segments from a transmission line.

10. A device according to claim 1 wherein said segments when in said open position define an access opening extending to a central portion of said segments,
    said urging means including a resilient means extending under tension within said segments and connected at one end to the inner one of said segments and at the opposite end to a releasable pin means extending through an aperture in the outer one of said segments and through a slot in the inner one of said segments,
    said means for maintaining said segments in their open position comprising a second pin means extending through aligned apertures in said segments and thereby maintaining said segments in said open position against the tension of said resilient means,
    both said pin means including means outwardly of said segments for selectively removing said pin means from said segments,
    removal of said second pin means effecting closure of said segments together for clamping said segments about a transmission line,
    removal of said first pin means effecting release of the tension in said resilient means to permit release of said segments from clamping engagement with a transmission line.

11. A span marker comprising a pair of nesting shell segments pivoted together for movement about a central pivot axis,
    said shell segments being pivotable about said axis to an open position wherein said segments are separated from one another along leading edge portions of each to define an access opening between said edge portion extending inwardly of said segments to a position adjacent said pivot axis,
    said segments being pivotable about said axis to a closed position wherein said leading edge portions lie next adjacent one another so that said segments define a closed hollow body,
    portions of said shell segments being in an overlapping relationship to one another in both the open and closed positions thereof,
    the inner ends of said leading edge portions closest to said pivot axis defining a central opening through said body for receiving a transmission line when said segments are in their closed position,
    said central opening being sized so as to easily receive a transmission line when said segments are in said open position and to clampingly engage the transmission line when said segments are in their closed position,
    resilient closing means within the interior space defined by said segments and interconnecting the overlapping portions thereof in tension so as to urge said segments to their closed position and so as to maintain said segments in their closed position in clamping engagement with a transmission line,
    releasable locking means interengageable with said overlapping portions of said segments to hold said segments in said open position against the tension of said closing means,
    and means for selectively releasing the tension of said closing means so as to release said segments from clamping engagement with a transmission line.

12. A device according to claim 11 wherein the overlapping portion of the inner one of said shell segments has a slot therein elongated in a plane transverse to said pivot axis, said slot having a circumferential length at least as great as the maximum circumferential distance between the leading edge portions of said nesting shell segments when said segments are in their open position, said releasing means comprising a removable pin extending through an aperture in the outer one of said shell segments and through said slot in said inner shell segment and anchoring within said segments one end of said resilient closing means so that when said pin is removed the tension in said closing means is released.

13. A device according to claim 11 including lock-release means connected to said locking means for releasing said locking means from locking engagement with said segments to enable said segments to close about a transmission line.

14. A device according to claim 13 wherein said lock-release means includes an elongate suspension means, attaching means interconnecting said suspension means and said locking means to hold said marker against one end of said suspension means, removal means on said suspension means for selectively removing said locking means from said segments, and actuator means on said suspension means operable from a position remote from said marker for actuating said removal means and thereby closing said segments about a transmission line and disconnecting said marker from said lock-release means.

References Cited

UNITED STATES PATENTS

| | | | |
|---|---|---|---|
| 242,254 | 5/1881 | Bird | 220—35 |
| 297,487 | 4/1884 | Bacon | 116—114 |
| 1,553,540 | 9/1925 | Kurtz | 294—86.27 |
| 1,721,234 | 7/1929 | Russell | 294—86.27 |

FOREIGN PATENTS

| | | |
|---|---|---|
| 701,422 | 1/1965 | Canada. |
| 1,284,766 | 1/1962 | France. |

LOUIS J. CAPOZI, *Primary Examiner.*